(12) United States Patent
Vallelly et al.

(10) Patent No.: US 10,569,308 B2
(45) Date of Patent: Feb. 25, 2020

(54) MATERIAL PROCESSING APPARATUS

(71) Applicant: CDE Global Limited, Cookstown, County Tyrone (GB)

(72) Inventors: Kevin Vallelly, Maghera (GB); Christopher McKeown, Magherafelt (GB)

(73) Assignee: CDE Global Limited, Cookstown, County Tyrone (GB)

( * ) Notice: Subject to any disclaimer, the term of this patent is extended or adjusted under 35 U.S.C. 154(b) by 245 days.

(21) Appl. No.: 15/481,682

(22) Filed: Apr. 7, 2017

(65) Prior Publication Data

US 2017/0291198 A1 Oct. 12, 2017

(30) Foreign Application Priority Data

Apr. 12, 2016 (GB) .................................. 1606150.9

(51) Int. Cl.
| | |
|---|---|
| *B08B 3/10* | (2006.01) |
| *B03B 5/00* | (2006.01) |
| *B03D 1/02* | (2006.01) |
| *B03D 1/16* | (2006.01) |
| *B09C 1/00* | (2006.01) |
| *C03C 1/02* | (2006.01) |

(52) U.S. Cl.
CPC ............... *B08B 3/104* (2013.01); *B03B 5/00* (2013.01); *B03D 1/02* (2013.01); *B03D 1/16* (2013.01); *B09C 1/00* (2013.01); *C03C 1/022* (2013.01)

(58) Field of Classification Search
None
See application file for complete search history.

(56) References Cited

U.S. PATENT DOCUMENTS

| | | | |
|---|---|---|---|
| 2,679,982 A | 6/1954 | Thyle | |
| 5,056,541 A | 10/1991 | Schade et al. | |
| 6,102,053 A * | 8/2000 | Van De Steeg | ........... B09C 1/00 134/13 |
| 2004/0026342 A1* | 2/2004 | O'Brien | .................... B03B 9/00 210/788 |

(Continued)

FOREIGN PATENT DOCUMENTS

| | | |
|---|---|---|
| DE | 4326200 | 2/1994 |
| DE | 19907513 | 8/2000 |
| FR | 2717710 | 9/1995 |

*Primary Examiner* — Cristi J Tate-Sims
(74) *Attorney, Agent, or Firm* — Gardner, Linn, Burkhart & Ondersma LLP

(57) ABSTRACT

An apparatus for the wet attrition of particulate material comprising an attrition scrubber; a dewatering screen comprising a deck and a sump beneath the deck, the dewatering screen being mounted upstream of the attrition scrubber whereby oversize material from a downstream end of the deck of the dewatering screen passes into the attrition scrubber; and a hydrocyclone wherein an underflow, containing a coarser fraction of the feed slurry, passes out of a lower outlet of the hydrocylone while an overflow, containing a finer fraction of the feed slurry and most of the water, passes out of an outlet at the upper end of the hydrocyclone, a pump being provided for pumping material from the sump of the dewatering screen to the inlet of the hydrocyclone, wherein the underflow from the hydrocyclone is passed into the attrition scrubber.

8 Claims, 1 Drawing Sheet

(56) References Cited

U.S. PATENT DOCUMENTS

| | | | | |
|---|---|---|---|---|
| 2006/0176771 A1* | 8/2006 | Adams | ................ | B01F 7/00633 |
| | | | | 366/270 |
| 2010/0287828 A1* | 11/2010 | Flemming | ............... | B03B 9/005 |
| | | | | 44/626 |
| 2011/0174696 A1* | 7/2011 | Young | ...................... | B03D 1/02 |
| | | | | 209/18 |
| 2016/0175894 A1* | 6/2016 | Convery | ................. | B08B 3/104 |
| | | | | 134/25.1 |

* cited by examiner

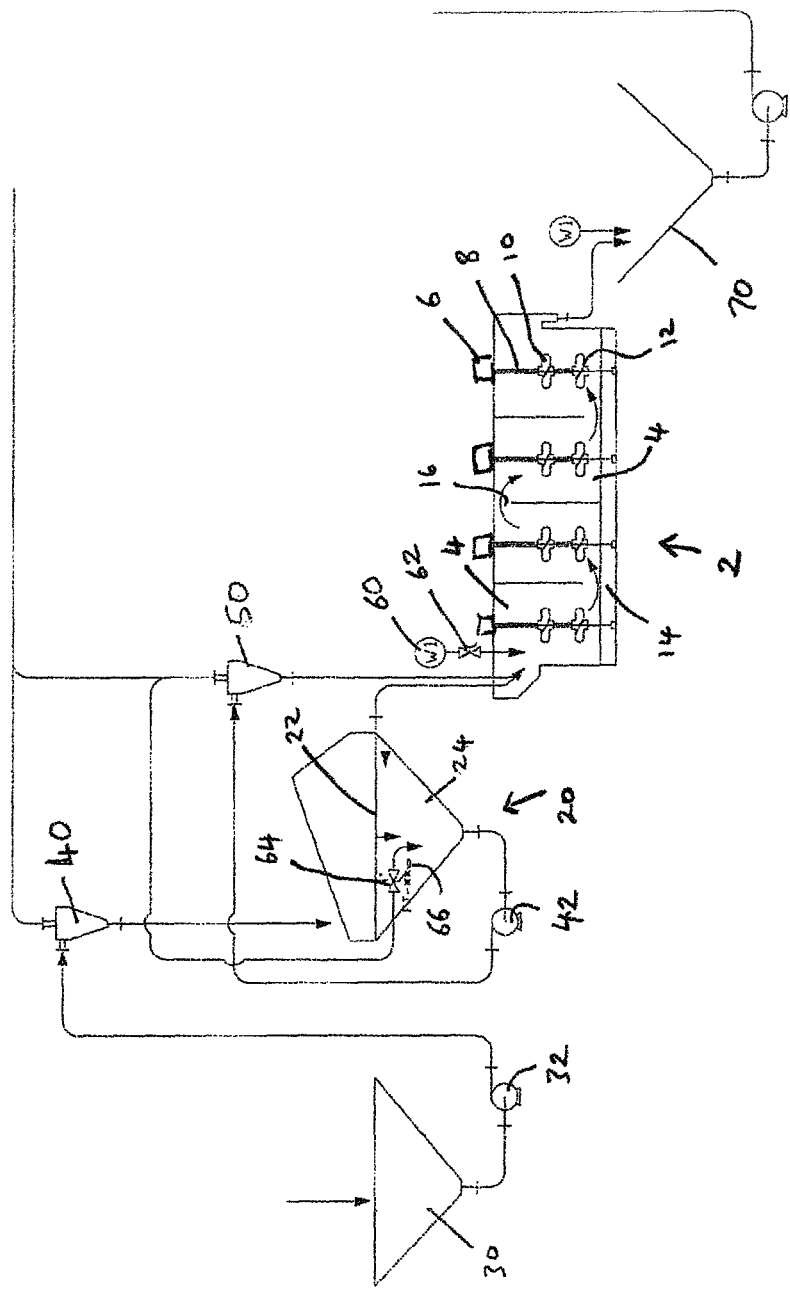

MATERIAL PROCESSING APPARATUS

FIELD OF THE INVENTION

This invention relates to a materials processing apparatus and method for the wet attrition of particulate material and, in particular, to an attrition scrubber for cleaning contaminated particulate material such as for removing surface contamination from sand particles and breaking up friable material and clays to facilitate separation of such materials from the sand product, liberating clean particles from the contaminated feed material.

BACKGROUND OF THE INVENTION

Attrition scrubbers are used for cleaning contaminated particulate material, in particular for delaminating clay from sand particles. The particulate material is typically delivered to the attrition scrubber as a liquid slurry having water content of between 20% and 25% by weight. Typically attrition scrubbers comprise several attrition cells, each cell having two or more sets of impellers mounted on a common shaft driven by a respective drive motor, typically an electric motor, such that the movement of the blades of the impellers cause intense scrubbing, polishing and disintegration of the particulate material located within each cell.

A problem with known attrition scrubbers is that the water content of the slurry must be carefully controlled to ensure efficient operation of the attrition scrubber. If too much water is present the slurry may not be sufficiently dense for the attrition process to take place. If the water content is insufficient the load applied to impellor drive motors and to the impellor blades may cause damage to such components.

SUMMARY OF THE INVENTION

According to a first aspect of the present invention there is provided a materials processing apparatus for the wet attrition of particulate material, the apparatus comprising an attrition scrubber comprising at least one mixing chamber having at least one pair of opposing impeller blades or paddles arranged to direct material in opposing directions to facilitate attrition of the material within the mixing chamber, and a drive device for driving the impeller blades or paddles; a dewatering screen comprising a deck having a plurality of openings therein for passing water and undersize material therethrough into a sump beneath the deck, a vibration generator or vibration generating means being provided for imparting vibration to the deck, the dewatering screen being mounted upstream of the attrition scrubber whereby oversize material from a downstream end of the deck of the dewatering screen passes into the mixing chamber; and a hydrocyclone comprising a cylindrical body having an inlet for supplying a feed slurry into the hydrocyclone tangentially, and a conical base, outlets being provided at upper and lower ends of the hydrocyclone, whereby an underflow, containing a coarser fraction of the feed slurry, passes out of the lower outlet while an overflow, containing a finer fraction of the feed slurry and most of the water, passes out of the outlet at the upper end of the hydrocyclone, a pump being provided for pumping material from the sump of the dewatering screen to the inlet of the hydrocyclone, wherein the underflow from the hydrocyclone is passed into the mixing chamber of the attrition scrubber.

The water content of the sand delivered into the attrition scrubber from the deck of the dewatering screen is typically around 15% by weight. Therefore additional water is required to meet the ideal water content of between 20% and 25% by weight for efficient operation of the attrition scrubber. Adding fresh water to achieve this water content leads to a high water consumption. Therefore adding water from the underflow of the hydrocyclone is a much more efficient way of achieving the correct water content for operation of the attrition scrubber in terms of water consumption than prior art methods. Furthermore, using the underflow of the hyrdrocyclone reduces the loading on the dewatering screen and thereby increases the capacity of the system, enabling a higher total throughput to be achieved for a given size of dewatering screen.

A further water supply may be provided for selectively adding water to the mixing chamber of the attrition scrubber to control the water content of the slurry contained therein. Optionally, a controller may be provided for controlling the amount of water added to the mixing chamber from the further water supply as a function of the load imposed on the drive device of the attrition scrubber or exerted thereby.

In one embodiment, at least a portion of the overflow from the hydrocyclone may be passed into the sump of the dewatering screen to maintain a predetermined level within the sump. A flow control valve may be provided for controlling the flow rate of the overflow from the hydrocyclone passed into the sump of the dewatering screen.

The attrition scrubber may comprise a plurality of mixing chambers, each mixing chamber having one or more impeller blades or paddles rotatably mounted therein, and a drive device for driving the blades or paddles. At least some of the mixing chambers may be coupled together in series such that material passes through the mixing chambers in turn.

A feed material may be arranged to pass through a further hydrocyclone upstream of the dewatering screen, an underflow from the further hydrocyclone being delivered into the deck of the dewatering screen. At least a portion of the overflow from the first and further hydrocyclones is passed to a settling tank to facilitate reuse of the water contained therein.

These and other objects, advantages and features of the invention will become apparent upon review of the following specification in conjunction with the drawings.

BRIEF DESCRIPTION OF THE DRAWINGS

A materials processing apparatus in accordance with an embodiment of the present invention will now be described, by way of example only, with reference to the accompanying drawings, in which:

FIG. 1 is a schematic view of a material processing apparatus in accordance with an embodiment of the present invention.

DESCRIPTION OF THE PREFERRED EMBODIMENTS

As can be seen from FIG. 1, a materials processing apparatus in accordance with an embodiment of the present invention comprises an attrition cell cluster 2 comprising a plurality of cells 4, four cells in the example shown arranged in series, each cell comprising a chamber for holding an aqueous slurry of particulate material, each cell 4 having an electric drive motor 6 mounted at an upper end thereof, the drive motor 6 being coupled to a vertically extending drive shaft 8 extending into the respective cell 4 and having at least two sets of impeller paddles 10, 12 mounted thereon (more preferably three), at least two of the sets of paddles 10, 12 being arranged to direct material in opposite and opposing directions to facilitate attrition of the material, resulting in intense scrubbing, polishing and disintegration of the sand, delaminating clay, graphite and other contaminants from the sand grains.

The drive motor 6 of each cell 4 can be powered to rotate the respective drive shaft 8 and thus move the respective sets of impeller paddles 10, 12 through the sand or other particulate material slurry contained within each cell 4, causing particles of the particulate material to act against one another, whereby intense scrubbing, polishing and disintegration of the particulate material located within each cell 4.

Openings 14, 16 are provided between the cells 4 at alternating locations between upper and lower ends of adjacent cells 4 so that material must pass through all of the cells in series, preferably passing vertically though each cell between the openings.

Upstream of the attrition cell cluster 2 is provided a dewatering screen 20 comprising a deck 22 having a plurality of openings therein for passing water and undersize material therethrough into a sump 24 beneath the deck 22, a vibration generator or vibration generating means being provided (not shown) for imparting vibration to the deck 22, the structure of the dewatering screen 20 being as is conventionally used for dewatering and grading particulate material. The oversized material from the downstream end of the deck 22 of the dewatering screen 20 is arranged to be passed into the attrition cell cluster 2, the oversize material having a water content of around 15% by weight.

A collection sump 30 is provided for receiving a feed material, typically comprising a slurry of sand, water and some contaminants, such as clay. This feed material is pumped by a first feed pump 32, such as a centrifugal pump, to the inlet of a first hyrdocyclone 40, wherein fine contaminants and some of the water is removed from the feed material. The underflow from the first hydrocyclone 40, comprising a relatively course fraction of the feed material, is fed onto an upstream end of the deck 22 of the dewatering screen 20 whereupon it is washed, graded and partially dewatered, while the overflow from the first hydrocyclone 40, comprising a relatively fine fraction of the feed material (mainly contaminants) and most of the water, is preferably passed to a collection vessel (not shown) for treatment and/or reuse, for example to be supplied onto the deck of the dewatering screen.

Water and undersize material is collected in the sump 24 beneath the deck 22 of the dewatering screen 20 from which it is pumped, via a suitable pump 42 to the inlet of a second hydrocyclone 50. The underflow from second hydrocyclone 50 is passed into the attrition cell cluster 2 to increase the water content of the material in the attrition cell cluster. An additional water supply 60 is provided for adding further water to the upstream mixing chamber of the attrition cell cluster 2 if required. A flow control valve 62 is provided for controlling the flow rate water from the additional water supply 60, the flow control valve 62 being controlled by a controller as a function of the torque applied by the drive motor of the upstream cell of the attrition cell cluster 2 (which may be monitored using a Current Transformer) to achieve the desired water content/concentration within the attrition cell cluster 2. Typically the water content of the material in the attrition cell cluster should be between 20% and 25% by weight. The apex diameter of the second hydrocyclone 50 may be increased to increase the flow rate of water in the underflow from the second hydrocyclone 50. This arrangement reduces fresh water requirements and reduces loading on the dewatering screen, increasing system capacity.

A portion of the overflow from the second hydrocyclone 50 is passed into sump 24 of the dewatering screen 20 under the control of a flow control valve 64 to maintain a predetermined level within the sump 24 of the dewatering screen 20. A mechanical float 66 may be provided in the sump 24 of the dewatering screen 20 which may be used to control the control valve 64 to control the amount of overflow from the second hydrocyclone 50 that is passed into the sump 24, thus avoiding the risk of pump cavitation. Similarly a portion of the overflow from either the first or second hydrocyclones 40, 50 may be passed into the collection sump 30 for the same purpose.

In an alternative embodiment the feed material could be fed directly onto the deck 22 of the dewatering screen 20 from another process, for example from a classification tank. It is envisaged that oversize material (for example +2 mm) may be removed by a separate grading screen upstream of the dewatering screen and the undersize material from the separate grading screen (for example −2 mm) would drop/pass into this first sump to be pumped onto the dewatering screen.

The controller may comprise a PLC (programmable logic controller), controlling the operation of the drive motors 6 of the attrition cell cluster 2, monitoring the torque applied by or exerted on the drive motors 6 and controlling the valve 62, which may be a motorised or pneumatically operated valve, to control the supply water from the additional water supply 60 into the attrition cell cluster 2 to achieve the required water content.

The water content of the material within the attrition cell cluster 2 is preferably controlled to obtain a water content of 20% to 25% by weight (adding water to attrition cell cluster via the inlet) during normal operation of the attrition cell cluster 2 to ensure optimum operation of the attrition cell cluster 2.

The slurry discharged from the attrition cell cluster 2 may be fed into a sump 70 or tank adjacent and downstream of the attrition cell cluster 2, possibly with the addition of further water, for further processing and/or stockpiling.

The invention is not limited to the embodiment(s) described herein, but can be amended or modified without departing from the scope of the present invention, which is intended to be limited only by the scope of the appended claims as interpreted according to the principles of patent law including the doctrine of equivalents.

The invention claimed is:

1. A materials processing apparatus for the wet attrition of particulate material, the apparatus comprising:
   an attrition scrubber comprising at least one mixing chamber having at least one pair of opposing impeller blades or paddles arranged to direct material in opposing directions to facilitate attrition of the material within the mixing chamber, and a drive device for driving the impeller blades or paddles;
   a dewatering screen comprising a deck having a plurality of openings therein for passing water and undersize material therethrough into a sump beneath the deck, a vibration generator for imparting vibration to the deck, and the dewatering screen being mounted upstream of the attrition scrubber whereby oversize material from a downstream end of the deck of the dewatering screen passes into the mixing chamber; and
   a hydrocyclone comprising a cylindrical body having an inlet for supplying a feed slurry into the hydrocyclone tangentially, and a conical base, an upper outlet at an upper end of the hydrocyclone and a lower outlet at a lower end of the hydrocyclone, whereby an underflow, containing a coarser fraction of the feed slurry, passes out of the lower outlet while an overflow, containing a finer fraction of the feed slurry and most of the water, passes out of the upper outlet, a pump being provided for pumping material from the sump of the dewatering screen to the inlet of the hydrocyclone, wherein the underflow from the hydrocyclone is passed into the mixing chamber of the attrition scrubber and wherein at least a portion of the overflow from the hydrocyclone is passed into the sump of the dewatering screen to maintain a predetermined level within the sump.

2. The apparatus of claim 1, wherein a further water supply is provided for selectively adding water to the mixing chamber of the attrition scrubber to control the water content of the slurry contained therein.

3. The apparatus of claim 2, wherein a controller is provided for controlling the amount of water added to the mixing chamber from the further water supply as a function of the load imposed on the drive device of the attrition scrubber or exerted thereby.

4. The apparatus of claim 1, wherein the attrition scrubber comprises a plurality of mixing chambers, each mixing chamber having one or more impeller blades or paddles rotatably mounted therein, and a drive device for driving the blades or paddles.

5. The apparatus of claim 4, wherein at least some of the mixing chambers are coupled together in series such that material passes through the mixing chambers in turn.

6. The apparatus as claimed in claim 1, wherein a feed material passes through a further hydrocyclone upstream of the dewatering screen, an underflow from the further hydrocyclone being delivered into the deck of the dewatering screen.

7. The apparatus of claim 6, wherein at least a portion of the overflow from the first and further hydrocyclones is passed to a settling tank to facilitate reuse of the water contained therein.

8. A materials processing apparatus for the wet attrition of particulate material, the apparatus comprising:
   an attrition scrubber comprising at least one mixing chamber having at least one pair of opposing impeller blades or paddles arranged to direct material in opposing directions to facilitate attrition of the material within the mixing chamber, and a drive device for driving the impeller blades or paddles;
   a dewatering screen comprising a deck having a plurality of openings therein for passing water and undersize material therethrough into a sump beneath the deck, a vibration generator for imparting vibration to the deck, and the dewatering screen being mounted upstream of the attrition scrubber whereby oversize material from a downstream end of the deck of the dewatering screen passes into the mixing chamber; and
   a hydrocyclone comprising a cylindrical body having an inlet for supplying a feed slurry into the hydrocyclone tangentially, and a conical base, an upper outlet at an upper end of the hydrocyclone and a lower outlet at a lower end of the hydrocyclone, whereby an underflow, containing a coarser fraction of the feed slurry, passes out of the lower outlet while an overflow, containing a finer fraction of the feed slurry and most of the water, passes out of the upper outlet, a pump being provided for pumping material from the sump of the dewatering screen to the inlet of the hydrocyclone, wherein the underflow from the hydrocyclone is passed into the mixing chamber of the attrition scrubber;
   wherein at least a portion of the overflow from the hydrocyclone is passed into the sump of the dewatering screen to maintain a predetermined level within the sump; and
   wherein a flow control valve is provided for controlling the flow rate of the overflow from the hydrocyclone passed into the sump of the dewatering screen.

* * * * *